United States Patent
Cramer et al.

(10) Patent No.: US 6,697,488 B1
(45) Date of Patent: Feb. 24, 2004

(54) PRACTICAL NON-MALLEABLE PUBLIC-KEY CRYPTOSYSTEM

(75) Inventors: Ronald Cramer, Zurich (CH); Victor Shoup, Zurich (CH)

(73) Assignees: International Business Machines Corporation, Armonk, NY (US); Swiss Federal Institute of Technology, Zurich (CH)

( * ) Notice: Subject to any disclaimer, the term of this patent is extended or adjusted under 35 U.S.C. 154(b) by 0 days.

(21) Appl. No.: 09/250,761

(22) Filed: Feb. 16, 1999

Related U.S. Application Data

(60) Provisional application No. 60/097,899, filed on Aug. 26, 1998.

(51) Int. Cl.[7] .................................................. H04K 1/00
(52) U.S. Cl. ............................ 380/30; 380/28; 380/44
(58) Field of Search ............................ 380/285, 44, 28, 380/30; 713/170, 176

(56) References Cited

U.S. PATENT DOCUMENTS 5,640,454 A * 6/1997 Lipner et al. ............... 380/286
6,353,888 B1 * 3/2002 Kakehi et al. .............. 713/168

OTHER PUBLICATIONS

Menezes et al.(HanDbook of Applied Cryptography),1997, CRC Press, pp. 452–458,294–298.*
Schneier (Applied Cryptography)1996, John Wiley and Sons, Second Edition,pp. 476–478.*

* cited by examiner

*Primary Examiner*—Ayaz Sheikh
*Assistant Examiner*—Hosuk Song
(74) *Attorney, Agent, or Firm*—L. Herzberg

(57) ABSTRACT

The present scheme improves the security of encrypted data or information by using of a practical public-key cryptosystem that is able to resist adaptive attacks. The disclosed scheme does not leak any information about the secret of the used key. Therefor the scheme generates an extended private key and public key. A message m, also referred to as plaintext, is encryptable to a ciphertext t by using the public key. Only a recipient with the right private key is able to decrypt the ciphertext r. But before a decryption starts, a verification of the ciphertext t takes place. Such a verification allows to prove the legitimation of the ciphertext t. That means, the ciphertext t is investigated and either decrypted back to the plaintext or rejected if a chosen ciphertext is fed, ie. the ciphertext is illegitimate or invalid.

31 Claims, 3 Drawing Sheets

PRACTICAL NON-MALLEABLE PUBLIC-KEY CRYPTOSYSTEM

CROSS REFERENCES

This application claims priority of U.S. Provisional Application, serial number 60/097,899, filed Aug. 26, 1998, entitled, "Practical Public Key Cryptosystem Provably Secure against Adaptive Chosen Ciphertext Attack."

TECHNICAL FIELD

The invention relates to secure communications. More particularly the invention relates to cryptographic communication systems and methods for use in data-processing systems to enhance security. The proposed public-key cryptosystem is secure against a lunch-time attack and an adaptive chosen ciphertext attack.

BACKGROUND OF THE INVENTION

Secrecy and security are important factors in today's computationally connected world. Transmitted information is restricted to an intended receiver and not suitable for everyone. For assuring secure and authenticated communications, cryptographic methods arc help- and useful. A cryptographic system is a system for sending a message from a sender to a receiver over a medium so that the message is 'secure'. That means, only the intended receiver can recover the message. The cryptographic system converts the message, also referred to as plaintext, into an encrypted format, known as ciphertext. The encryption is accomplished by manipulating or transforming the message using a cipher key or keys. The receiver decrypts the message by converting the ciphertext back to plaintext. This is performed by reversing the manipulation or transformation process using the cipher key or keys. Such an encrypted transmission is secure, so long as only the sender and the receiver have knowledge of the cipher key. Several cryptographic systems have been proposed in the past such as public-key cryptosystems. In general, an information used with an algorithm to encrypt and decrypt a message is called a key. The public key cryptosystem uses two keys, one private and one public, which are related to each other. Hence, in the public-key cryptosystem, the private key is always linked mathematically to the public key. Therefore, it is always possible to attack a public-key system by deriving the private key from the public key. Typically, the defense against this is to make the problem of deriving the private key from the public key as difficult as possible.

Diffie-Hellman:

A first public-key cryptographic scheme was published by Diffie and Hellman, "New Directions in Cryptography", IEEE Trans. Inform. Theory, vol. IT-22, pp. 644–654, November 1976. This scheme, also referred to as Diffie-Hellman key agreement, describes a public-key system based on discrete exponential and logarithmic functions and is primarily used for public-key exchange and public-key cryptosystems. The basis for the technique is the difficulty of calculating logarithms in modular arithmetic. Say A and B wish to establish a key. A sends B a number g, a modulus p and the number $h_1 = g^{e1} \mod(p)$, where e1 is a large number. B then sends back to A the number $h_2 = g^{e1} \mod(p)$. They each then use the number $k = g^{(e1\ e2)} = h_1^{e2} = h_2^{e1} \mod(p)$ as the private key. Any adversary must be able to calculate either e1 from g, $h_1$ or e2 from g, $h_2$. This is believed to be very hard for large enough values of g and p, since no general, fast algorithms are known for solving a discrete logarithm function.

RSA:

Another public-key cryptosystem is disclosed in "On Digital Signatures and Public key Cryptosystems", Commun. Ass. Comput. Mach., vol. 21, pp. 120–126, 1979, by R. L. Rivest, A Shamir, and L. M. Adelman. The so-called RSA scheme is based on the fact that it is easy to generate two large primes and multiply them, whereas it is much more difficult to factor the result, that is, to derive the large primes from their product. Therefore it should be computationally infeasible to perform this derivation. The product can therefore be made public as part of the enciphering key without compromising the primes that constitute the deciphering key.

ElGamal:

The publication "A Public Key Cryptosystem and a Signature Scheme Based on Discrete Logarithms" by T. ElGamal in the IEEE Trans. Inform. Theory, vol. IT-31, pp. 469–472, 1985, proposes a further public-key cryptosystem which implements the Diffie-Hellman key agreement. The ElGamal scheme comprising a secret key z and a public key h can be described in a simple way as the following. A message m can be encoded as elements of a cryptographic group G. The secret key z can be chosen at random from a set of numbers modulo q, denoted as $Z_q$. The public key h is calculated by $h = g^z$, whereby g is also chosen from the group G at random. The encryption starts by choosing a random element r in $Z_q$. A ciphertext comprising u and e is derived by $u = g^r$ and $e = h^r m$. This ciphertext can be decrypted to the message m by $m = e/u^z$. The security of the ElGamal encryption scheme relies on the difficulty of recomputing discrete logarithms, but the ElGamal encryption is only secure against passive attacks and not secure against chosen ciphertext attacks. In particular, the ElGamal encryption scheme is trivially malleable. Thus, if u, e encrypts m, then u, ea encrypts ma.

All mentioned schemes are insecure against active attacks, in which an attacker or adversary can inject chosen messages into the stream of data and observe the resulting behaviors. An "adaptive chosen ciphertext attack" is the strongest known form of this kind of attack and is generally accepted to be the most aggressive kind of attack that any cryptosystem should be expected to withstand. Such an attack is one in which an adversary has access to a "decryption oracle", e.g. a server, allowing the adversary to decrypt ciphertexts of his choice. The word "adversary" is commonly used in cryptography to refer to an opponent, an enemy, or any other mischievous person that desires to compromise one's security. Typically, one distinguishes between a weak form of attack, known as a lunch-time attack, and the strongest possible form, the adaptive chosen ciphertext attack. In the lunch-time attack, the adversary queries the decryption oracle a number of times, after which the adversary obtains the target ciphertext that the adversary wishes to cryptanalyze, and is not allowed to query the decryption oracle further. In an adaptive attack, the adversary may continue to query the decryption oracle after obtaining the target ciphertext, whereby the adversary repeats the following process: he sends requests to the software or hardware units implementing the cryptographic scheme, observes the responses, and based on the responses constructs and sends more requests, with the aim of eventually breaking the scheme. In fact the adversary may send any ciphertext to the decryption oracle, except the target ciphertext. D. Bleichenbacher discloses in "Chosen ciphertext attacks against protocols based on RSA encryption standard PKCS #1", Advances in Cryptology-Crypto '98, pp. 1–12, 1998, design flaws in the widely used Internet security protocol SSL (Secure Socket Layer). Bleichenbacher's attack is a direct attack on what is supposed to be secure: the security protocol and the underlying encryption system. As mentioned above, such an adversary does more than just eavesdrop: he plays an active rule, sending carefully crafted encryptions to the SSL server, and then observes how the server responds to these encryptions. Based on these observations, the adversary can crack the code.

For many years, no public-key system was shown to be secure under a chosen ciphertext attack. M. Naor and M. Yung presented the first scheme provably secure against lunch-time attacks in their publication "Public-key cryptosystems provably secure against chosen ciphertext attacks", in 22nd Annual ACM Symposium on Theory of Computing, pages 427–437, 1990. Subsequently, D. Dolev, C. Dwork, and M. Naor presented in their publication "Non-malleable cryptography", in 23rd Annual ACM Symposium on Theory of Computing, pages 542–552, 1991, a scheme which is secure against adaptive chosen ciphertext attack. All of the known schemes provably secure under standard intractability assumptions are completely impractical, as they rely on general and expensive constructions for non-interactive zero-knowledge proofs.

I Damgard. proposed in the publication "Towards practical public key cryptosystems secure against chosen ciphertext attacks", in Advances in Cryptology-Crypto '91, pages 445–456, 1991, a practical scheme that he conjectured to be secure against lunch-time attacks; however, this scheme is not known to be provably secure, and is in fact demonstratably insecure against adaptive chosen ciphertext attack.

Y. Zheng and J. Seberry proposed in their publication "Practical approaches to attaining security against adaptively chosen ciphertext attacks", in Advances in Cryptology-Crypto '92, pages 292–304, 1992, practical schemes that are conjectured to be secure against chosen ciphertext attack, but again, no proof based on standard intractability assumptions is known.

C. H. Lim and P. J. Lee also proposed in their publication "Another method for attaining security against adaptively chosen ciphertext attacks", in Advances in Cryptology-Crypto '93, pages 420–434, 1993, practical schemes that were later broken by Y. Frankel and M. Yung, which was described in "Cryptanalysis of immunized LL public key systems", in Advances in Cryptology-Crypto '95, pages 287–296, 1995.

In a different direction, M. Bellare and P. Rogaway have presented in their publication "Random oracles are practical: a paradigm for designing efficient protocols", In First ACM Conference on Computer and Communications Security, 1993, and "Optimal asymmetric encryption", in Advances in Cryptology-Crypto '94, pages 92–111, 1994, practical schemes that are provably secure against adaptive chosen ciphertext attack in an idealized model of computation where a hash function is represented by a random oracle. While a proof of security in the random oracle model is certainly preferable to no proof at all, a proof in the "real world" would be even better.

R. Canetti, O. Goldreich, and S. Halevi showed in the publication "The random oracle model, revisited", in 30th Annual ACM Symposium on Theory of Computing, 1998, that there are cryptographic schemes that are secure in the random oracle model, but insecure in the real world—no matter what hash function is chosen. It is not yet clear what the implications of these results are.

While there are several provably secure encryption schemes in the literature, they are all impractical. Also, there have been several practical cryptosystems that have been proposed, but none of them has been proven secure under standard intractability assumptions.

All currently commercially available cryptosystems are potentially vulnerable to active attacks. Therefore it is an object of the present invention to provide a secure cryptosystem in order to overcome the disadvantages of the prior art.

It is another object of the present invention to provide a public-key cryptosystem that is secure against an attack such as a lunch-time attack.

It is still another object of the present invention to provide a public-key cryptosystem that is secure against an adaptive chosen ciphertext attack.

It is a further object of the present invention to achieve a public-key cryptosystem that is secure and practical at the same time.

SUMMARY OF THE INVENTION

The present invention improves the security of encrypted data or information by using a practical public-key cryptosystem that is able to resist adaptive attacks. The disclosed scheme does not leak any information about the secret of the used key. Therefor the scheme generates an extended private key and public key. A message m, also referred to as plaintext, can be encrypted to obtain to a ciphertext t by using the public key. This ciphertext t can be transmitted over an insecure channel, e.g. the Internet. Only a recipient with the right private key is able to decrypt the ciphertext t. But before a decryption starts, a simple verification of the ciphertext t is performable. Such a verification allows to prove the legitimacy of the ciphertext t. That means, the ciphertext t is investigated and can be either decrypted back to the plaintext if the ciphertext t is properly constructed, ie. the ciphertext is legitimate or valid, or can be rejected if a chosen ciphertext is revealed as having been fed, ie. the ciphertext is illegitimate or invalid. The rejection has the advantage that an adversary can not submit arbitrary ciphertexts and therefore the adversary gets no information about other encrypted data. Hence, a lunch-time attack or even an adaptive chosen ciphertext attack can not only be discovered, but such an attack can be prevented altogether. It further turns out that by rejecting all illegitimate ciphertexts, no information about the private key is leaked, which effectively neutralizes the chosen ciphertext attack and shows that the plaintext can be hidden perfectly.

The disclosed public-key scheme brings the advantage that adaptive attacks are useless for the attacker since no information is leaked. Therefore, by using the present public-key cryptosystem, a secure communication can be guaranteed also when sensitive or personal information, such as credit card details, authorizations, passwords, PIN codes, and so forth, are involved and transmitted. For example, e-commerce transactions which travel across the world can be achieved in a private and secure manner.

Security against adaptive chosen ciphertext attack also implies non-malleability, meaning that an adversary cannot take an encryption of some plaintext and transform it into an encryption of a different plaintext that is related to the original plaintext. It is another advantage of the present public-key scheme that it is not malleable.

The disclosed public-key scheme can be used not only for privacy, ie. encryption, but also for authentication.

The present system is secure against a lunch-time attack since the system is practical using a few exponentiations over a group. Further, by the application of a hash function, the system is secure against an adaptive chosen ciphertext attack. Moreover, the proof of security bases on standard intractability assumptions, namely, the hardness of the Diffie-Hellman decision problem in the underlying group, and the collision intractability of the hash function.

The hardness of the Diffie-Hellman decision problem, also referred to as DDH problem (Decisional Diffie-Hellman problem), is essentially equivalent to the security of the basic ElGamal encryption scheme against passive adversaries. Thus, with the additional assumption of a collision-resistant hash function and some computation, security against adaptive chosen ciphertext attack is achieved, whereas the basic ElGamal scheme is completely insecure against adaptive chosen ciphertext attack.

A public-key cryptosystem is proposed which is secure and practical at the same time.

Glossary

The following are informal definitions to aid in the understanding of the description.

Group: A group in the cryptographic sense is an algebraic system (G,*) consisting of a set of elements or numbers and a group operation (*) with some specified properties, where (*) is associative, has a neutral element, and where every element in G has an inverse element.

The choice of the symbol (*) is arbitrary. In fact, the operation of most groups is denoted by either + or •, and such groups are referred to as additive or multiplicative group, respectively.

Finite group: A group G is called finite if it contains only finitely many elements. The number of elements in a finite group is called its order.

For example, for any positive integer n, a set $Z_n$ consists of the integers 0, . . . , n−1, and it forms a group under the operation of addition modulo n. Moreover, the subset of $Z_n$ consisting of those integers relatively prime to n forms a group under multiplication modulo n, and is denoted $Z_n^*$. In particular, if p is prime, then $Z_n^*$ consists of $\{1, \ldots, p-1\}$, and is a group with p−1 elements.

Hash function: A hash function is a computationally efficient function mapping binary strings of arbitrary length to binary strings of some fixed length.

Collision resistant hash functions: A family of hash functions is collision resistant if given a random hash function H in the family, it is infeasible to find a collision, ie., two strings x≠y such that H(x)=H(y).

DESCRIPTION OF THE DRAWINGS

The invention is described in detail below with reference to the following schematic drawings.

All the figures are for the sake of clarity not shown in real dimensions, nor are the relations between the dimensions shown in a realistic scale.

DETAILED DESCRIPTION OF THE INVENTION

Figure 1A:
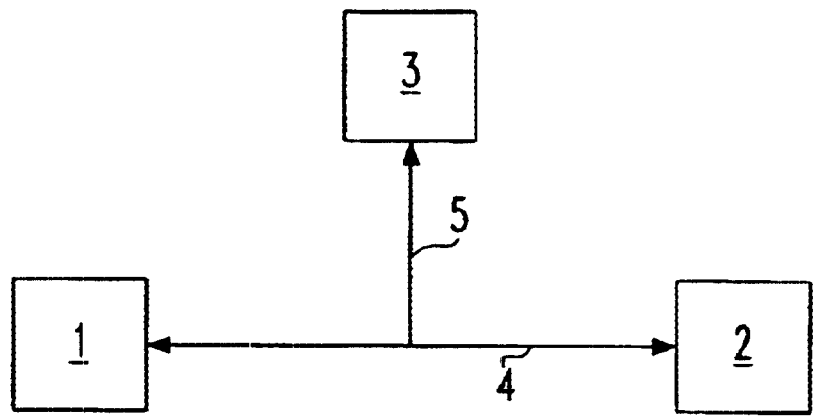
FIG. 1a shows a schematic illustration of an encrypted communication between two devices whereby an adversary is eavesdropping.
Figure 1B:
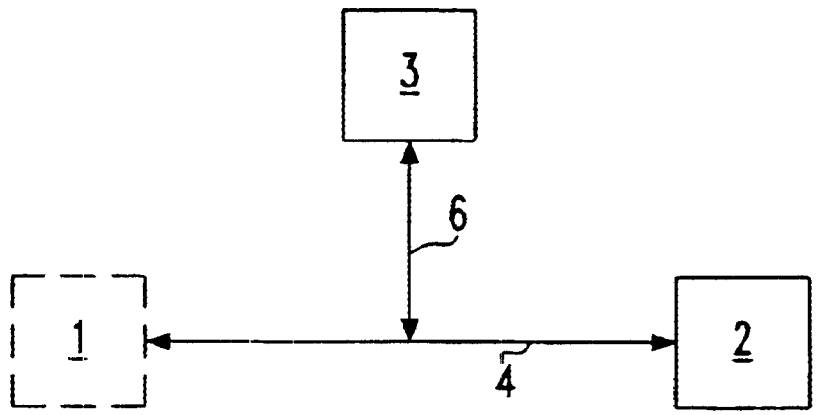
FIG. 1b shows a schematic illustration where an adversary has access to a decryption oracle.

In the following, the basic scheme according to the present invention is described in detail. Further, some implementation details and possible variations of the basic encryption scheme are addressed. FIG. 1a and FIG. 1b explain in a short way the problem of an attack.

FIG. 1a shows a typical scenario for an attack. Generally, FIG. 1a depicts a user's first device 1 and a second device 2 which is a server or a replying device, also referred to as "decryption oracle". The first device 1, which is a computer, is connected via an insecure channel 4, e.g. the Internet, to the second device 2. An adversary 3, which is here an attacker, has access to the insecure channel 4. The communication between the first device 1 and the second device 2 takes place in an encrypted manner, whereby a public-key cryptosystem is used. Hence, the user's first device 1 and the second device 2 process cryptographic messages. The adversary 3 can eavesdrop the insecure channel 4 by an eavesdropping channel 5. Therefore the adversary 3 gets the ciphertext of several messages. In this ciphertext-only attack, the adversary 3 tries to recover the plaintext of as many messages as possible and further the adversary 3 tries to deduce the key or keys therefrom.

FIG. 1b shows the same scenario as in FIG. 1a with the same numbering, but since the ciphertext-only attack is not really efficient, the adversary 3 here tries an adaptive attack by using an attack channel 6 in both directions. There are may other kinds of attacks, but an adaptive chosen ciphertext attack is the strongest known form of an attack. The point is that the adversary 3 has access to the second device 2, the "decryption oracle", via the attack channel 6 and the insecure channel 4. For that reason, the first device 1 is not really necessary, which is indicated by a dashed line. Now, the adversary 3 does not only eavesdrop, but he also sends messages of his choice to the second device 2 and tries to decrypt other ciphertexts. Therefore an efficient and practical cryptosystem is required that is able to withstand this strongest known form of an attack, the adaptive chosen ciphertext attack.

In the following, a practical public-key cryptosystem which is secure against adaptive chosen ciphertext attack as a first embodiment is described with reference to FIG. 2.

Figure 2:
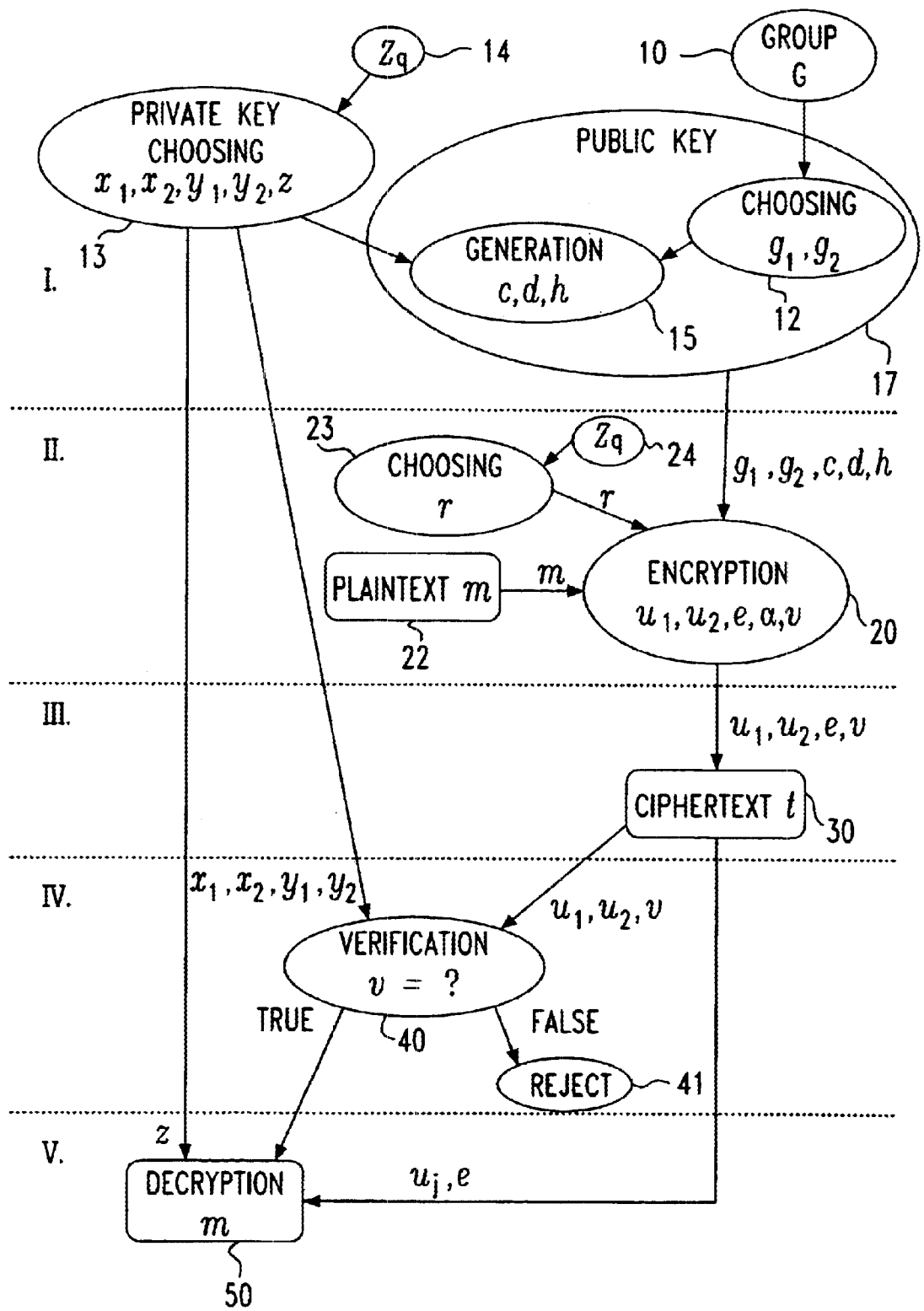
FIG. 2 illustrates a diagram of the basic scheme according to the present invention.

FIG. 2 shows an illustration of the basic scheme according to the present invention. FIG. 2 is split up in sections I to V which is indicated by horizontal dash dot lines. It is started in section I where a generation of a public key in a public-key generation step 17 and private key in a private key choosing step 13 is indicated. Below, section II follows wherein an encryption of a plaintext 22 to a ciphertext t in an encryption step 20 is depicted. The ciphertext 1, indicated by reference number 30, is public and transmittable over an insecure channel as described with reference to FIG. 1a and 1b. This is indicated in section III. A verification step 40 follows in section IV and finally a decryption in a decryption step 50 in section V.

The present public-key cryptosystem is usable in connection with calculating or computing means, e.g. a machine or a computer which processes at least two numbers via a mathematical operation and generates a third number. Further, the system can be implemented in software as well as in hardware. For the sake of clarity, not all described means are depicted in FIG. 2. The encrypted communication takes place via a direct link or a network as described above.

The single sections are numbered on the left side in FIG. 2 and are explained in detail in the following.

Section I

A random generator which is not depicted can be used for the key generation. A group G of prime number order q, where q is large, is provided, which is indicated by reference number 10. G is a cryptographic group with strong cryptographic properties, e.g. a multiplicative group. This group G can be a large prune order subgroup of the multiplicative group modulo a large prime number or a large prime order subgroup defined by an elliptic curve. The key generation algorithm uses the random generator and chooses in a choosing step 12 a first base-group-number $g_1$ and a second base-group-number $g_2$ from the group G, which can be expressed as $g_i$, $g_2 \in G$.

In the private-key choosing step 13 from a set of elements modulo q, denoted as $Z_q$ and indicated by reference number 14, for the private key a first exponent-number $x_1$, a second exponent-number $x_2$, a third exponent-number z, a fourth exponent-number $y_1$, and a fifth exponent-number $y_2$ are chosen at random. This can be expressed as follows.

$$x_1, x_2, y_1, y_2, z \in Z_q$$

Next, a first group-number c, a second group-number h, and a third group-number d are derived in a generation step 15 from the chosen numbers $g_1$, $g_2$, $x_1$, $x_2$, $y_1$, $y_2$, z by using calculating means according to the following formulas:

$$c = g_1^{x_1} g_2^{x_2}, \quad d = g_1^{y_1} g_2^{y_2}, \quad h = g_1^z$$

The public key is now complete and is represented by the numbers $g_1$, $g_2$, c, d, and h.

A monotone function $f_1$ of the first exponent-number $x_1$, a monotone function $f_2$ of the second exponent-number $x_2$, a third monotone function $f_3$ of the third exponent-number z, a monotone function $f_4$ of the fourth exponent-number $y_1$ and a fifth monotone function $f_5$ of the fifth exponent-number $y_2$ can be used instead of $x_1$, $x_2$, $y_1$, $y_2$, z, respectively. This provides an equivalent algorithm with several variations. The simplest way is to multiply, for example, $x_1$ by 1 which results in the original $x_1$. But not only integer numbers are usable within the functions $f$. The introduction of a monotone function $f$ should be reversed in a later step, e.g. in the verification step 40.

Section II

A cleartext message exists in a computer-readable and understandable form and is herewith called plaintext m. For example, the plaintext m comprises a number or numbers according to the ASCII code (American Standard Code for Information Interchange) representing data characters, e.g. letters, numbers, or signs. Generally, the plaintext m is represented by numbers of G or can be encoded as numbers of G.

The encryption uses here a hash function H, e.g. SHA-1 or MD-5, which is not depicted. This hash function H is public and hashes long strings to elements of $Z_q$. The hash function H is chosen from the family of universal one-way hash functions.

The plaintext m is provided and indicated as plaintext 22. The encryption algorithm runs as follows. First, a single exponent-number r is chosen at random in a r-choosing step 23 from a set of elements modulo q, denoted as $Z_q$ and indicated by reference number 24. The set of elements modulo q should be large and do not need to be the same set $Z_q$ as described in section I. Adequately as described above a monotone function $f_r$ of the single exponent-number r can be chosen. An encryption means computes a first universal cipher-number $u_1$, a second universal cipher-number $u_2$, an encryption cipher-number e, a hash-value a and a verification cipher-number v. This is processed in the encryption step 20 by using the public-key numbers $g_1$, $g_2$, c, d, and h, the single exponent-number r, and the plaintext m according to the formulas:

$$u_1 = g_1^r, \; u_2 = g_2^r, \; e = h^r m, \; a = H(u_1, u_2, e), \; v = c^r d^{ra}.$$

The ciphertext 30 comprises a first universal cipher-number $u_1$, a second universal cipher-number $u_2$, an encryption cipher-number e, and a verification cipher-number v. The first universal cipher-number $u_1$ and the encryption cipher-number e are encrypted analog to the ElGamal scheme. The second universal cipher-number $u_2$ and the verification cipher-number v are created for the purpose of a special kind of error detecting code. These can be used in the verification step 40 in section IV to find out whether a ciphertext is properly constructed or not. Several variations are possible to create the verification cipher-number v, e.g. by omitting $d^{ra}$.

As shown above, the verification cipher-number v bases here on the first group-number c, the third group-number d, the hash-value a, and the single exponent-number r.

Section III

The computed ciphertext 30 with the cipher-number $u_1$, $u_2$, e, v is transmittable via an insecure channel, as described above. For the sake of clarity, this is not indicated in section III in FIG. 2. The ciphertext 30 does not leak any information about the keys and therefore the plaintext m is hidden assuming the Decisional Diffie-Hellman problem, also referred to as DDH problem, is hard. For the transmission of the ciphertext 30, the sending device, e.g. the first device 1 as described with reference to FIGS. 1a and 1b, uses output means, whereas the receiving devices, e.g. the second device 2 as described with reference to FIGS. 1a and 1b, uses input means for receiving the ciphertext 30.

Section IV

Before the decryption in the decryption step 50 starts, the verification of the ciphertext 30 in the verification step 40 is applied by using verification means. The verification can be used independently from the decryption which is described in the next section V and is therefore depicted separately. The decryption may take place at another location where the verification step 40 is executed. This is advantageous because computing power can be shared or the verification as well as the decryption can be handled by especially prepared machines. Not all numbers of the ciphertext 30 are really necessary for the verification, e.g. the encryption cipher-number e is not used in the verification step 40.

Using the received ciphertext-numbers $u_1$, $u_2$, e, v, the verification means recompute the hash-value a by using the hash function H, which can be expressed as $a = H(u_1, u_2, e)$. Then it is tested by using the hash-value a and $x_1$, $x_2$, $y_1$, $y_2$ as part of the private key if $$u_1^{x_1 + y_1 a} u_2^{x_2 + y_2 a} = v \qquad [1]$$

The calculating or testing means outputs either true or false according to the condition [1]. If this condition [1] does not hold, i.e. results in false, the system outputs a reject message 41, which can be used for further processing, e.g. for terminating the connection.

The condition [1], also referred to as test [1] since there is a condition tested, in the verification step 40, together with the potential reject unless the condition is fulfilled, inhibits a decryption means or a decryptor from being misused as a decryption oracle.

As mentioned in section II the second universal cipher-number $u_2$ and the verification cipher-number v are created as error detecting code. Therefore the second base-group-number $g_2$ is introduced in section I in order to create a two-dimensional randomization, whereby the hash function H is used to diffuse the two dimensions. For a properly constructed ciphertext 30, it always holds that if $u_1=g_1^{r_1}$ and $u_2=g_2^{r_2}$, then $r_1=r_2$. Such ciphertexts are herewith also referred to as legitimate ciphertexts. There is nothing stopping an adversary, while performing a chosen ciphertext attack, to request the decryption of a ciphertext that is illegitimate, ie., with $r_1 \neq r_2$. This is the point of the test [1], where it is tested whether the received verification cipher-number v was created by the encryption algorithm according to encryption step 20 as described in section II. The test [1] will essentially ensure that all illegitimate ciphertexts are rejected. It further turns out that by rejecting all illegitimate ciphertexts, no information about the private key is leaked, while it effectively neutralizes the chosen ciphertext attack. Moreover, the error code information itself does not leak any useful information. The point of the hash-value in the computation is to prevent proofs of legitimacy from the adversary.

Section V

If the condition [1] holds, i.e. results in true, the plaintext m can be recovered in the decryption step 50 by using e, $u_1$, and z, whereby z is part of the private key. A decrypting means outputs:

$$m=e/u_1^z.$$

The ciphertext 30 contains the plaintext m in the encryption cipher-number e. Therefore the plaintext m can be recovered according to the ElGamal scheme, which uses the first universal cipher-number $u_1$ as part of the ciphertext 30 and the third exponent-number z part of the private key.

It is to be verified that the decryption of an encryption of a message yields the message or the plaintext m. Since $u_1=g_1^r$ and $u_2=g_2^r$, it is $$u_1^{x_1}u_2^{x_2}=g_1^{rx_1}g_2^{rx_2}=c^r.$$

Likewise, $u_1^{y_1}u_2^{y_2}=d^r$ and $u_1^{z_1}u_2^{z_2}=h^r$. Therefore, the test performed by the decryption algorithm will pass, and the output will be $e/h^r=m$.

The present scheme has the following advantages:

The described cryptosystem is secure against adaptive chosen ciphertext attack assuming that the hash function H is collision resistant, and the Diffie-Hellman decision problem is hard in the group G.

Assuming the adversary 3 does not find a collision in H, then with high probability, the decryption oracle 2 will reject all invalid ciphertexts during the attack.

In another embodiment the hash function H can be eliminated from the scheme, so that the security is based exclusively on the Diffie-Hellman decision problem for an arbitrary group G. For example, the group element d is changed by $d_1, \ldots, d_k$. For $1 \leq i \leq k$, it is $d_i=g_1^{y_{i1}}g_2^{y_{i2}}$, where $y_{i1}$ and $y_{i2}$ are random elements of $Z_q$ included in the private key. The derivation of the verification cipher-number v as well as the verification of the verification cipher-number v in the verification step 40 are to adapt accordingly.

Figure 3:
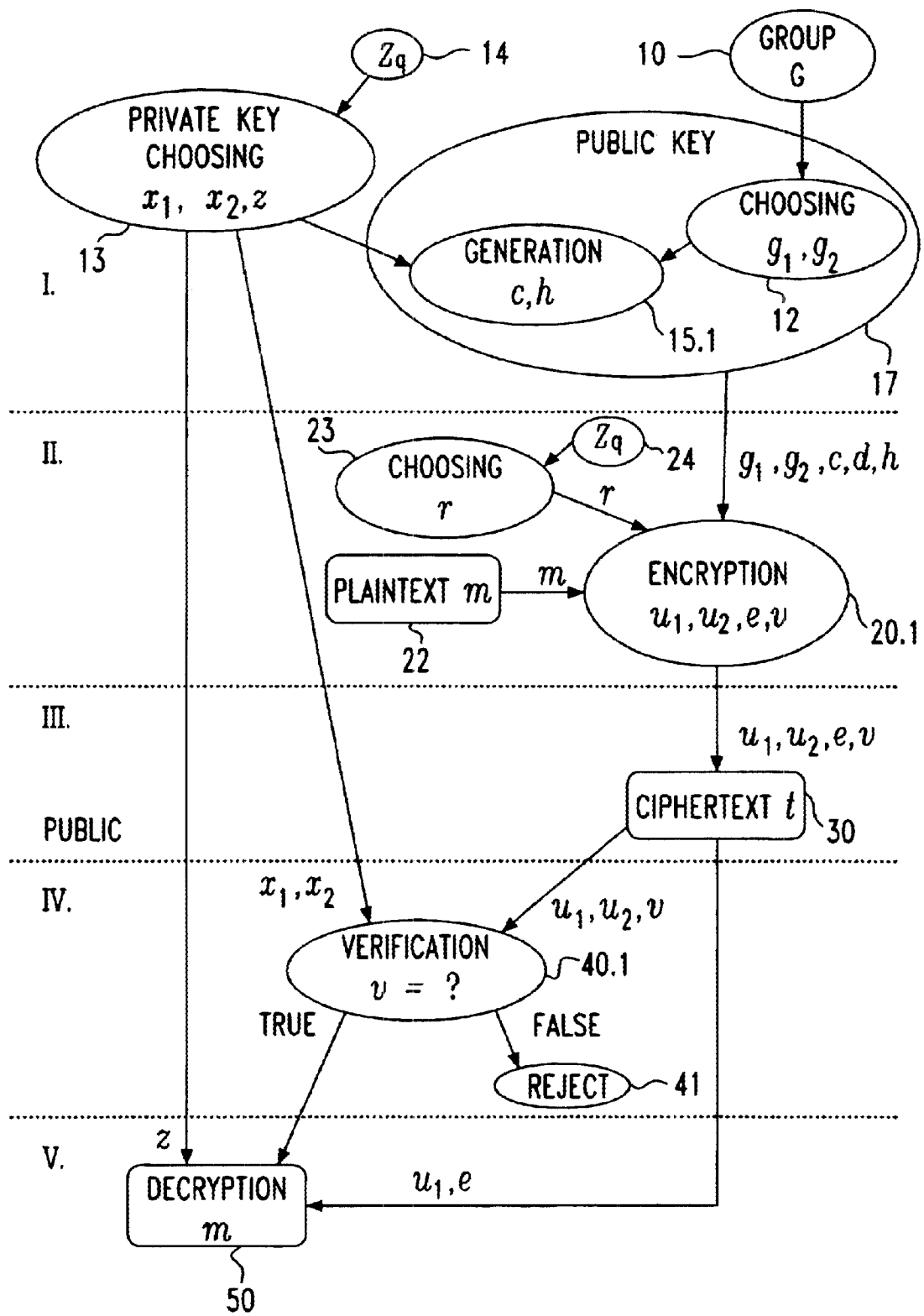
FIG. 3 illustrates a diagram of a simplified scheme.

In FIG. 3 a simplified version of the basic scheme which is able to withstand a lunch-time attack is described.

To achieve security against lunch-time attacks, one can simplify the above-described basic scheme, essentially by omitting d, $y_1$, $y_2$, and the hash function H. In the encryption step 20 in section II, it is computed $v=c^r$, and in the verification step 40 in section IV it is verified that $v=u_1^{x_1}u_2^{x_2}$.

FIG. 3 follows which shows a lunch-time attack resist system with an adequate numbering and ciphering as described with reference to FIG. 2.

Section I

The key generation algorithm uses the random generator and chooses in a choosing step 12 a first base-group-number $g_1$ and a second base-group-number $g_2$ from the group G, which can be expressed as $g_1, g_2 \in G$.

In the private-key choosing step 13.1 from a set of elements modulo q, denoted as $Z_q$ and numbered with reference number 14, for the private key a first exponent-number $x_1$, a second exponent-number $x_2$, a third exponent-number z are chosen at random. This can be expressed as follows.

$$x_1, x_2, z \in Z_q$$

Next, a first group-number c and a second group-number h are derived in a generation step 15.1 from the chosen numbers $g_1, g_2, x_1, x_2, z$ by using calculating means according to the following formulas:

$$c=g_1^{x_1}g_2^{x_2}, \ h=g_1^z$$

The public key is then complete and is represented by the numbers $g_1, g_2, c$, and h.

Section II

The plaintext m is provided and indicated as plaintext 22. First, a single exponent-number r is chosen at random in a r-choosing step 23 from a set of elements modulo q, denoted as $Z_q$. Then an encryption means computes a first universal cipher-number $u_1$, a second universal cipher-number $u_2$, an encryption cipher-number e, and a verification cipher-number v This is processed in the encryption step 20.1 by using the public-key numbers $g_1, g_2, c$, and h, the single exponent-number r, and the plaintext m according to the formulas:

$$u_1=g_1^r, \ u_2=g_2^r, \ e=h^r m, \ v=c^r.$$

As shown in the formula, the verification cipher-number v is here generated by raising the first group-number c to the power of the single exponent-number r.

The ciphertext 30 comprises $u_1, u_2, e, v$

Section III

The computed ciphertext 30 with the cipher-numbers $u_1, u_2, e, v$ is transmittable via an insecure channel, as described above.

Section IV

Using the received ciphertext-numbers $u_1, u_2, e, v$, the verification means tests if $$v=u_1^{x_1}u_2^{x_2}. \tag{2}$$

The calculating or testing means outputs either true or false according to the condition [2]. If this condition [2] does not hold, i.e. results in false, the system outputs a reject message 41, which can be used for further processing.

Section V

Otherwise, if the condition [2] holds, i.e. true, the plaintext m can be recovered in the decryption step 50 by using e, $u_1$, and z, whereby z is part of the private key. A decrypting means outputs:

$$m = e/u_1^z.$$

In the following sections, some implementation details and possible variations of the basic scheme for several embodiments are addressed.

(1) To define a group G, one choose a large prime p (say, 1024 bits long), such that p−1=2q, where q is also prime. Then the group G would be chosen to be the subgroup of index 2 in the group of units of integers modulo p. If one restricts a message to be an element of the set {1, ..., (p−1)/2}, then one can "encode" a message by squaring it modulo p, giving an element in G. One can recover a message from its encoding by computing the unique square root of its encoding modulo p that is in the set {1, ..., (p−1)/2}.

(2) This yields an implementation that is reasonably efficient. However, it would be more practical to work in a smaller subgroup, and it would be better to have a more flexible and efficient encoding scheme.

To do this, one could do the following. It is chosen a 1024-bit prime p such that p−1=qm, where q is a prime with, say, 240-bits. The group G would then be the subgroup of order q in the multiplicative group of units modulo p. Then, instead of encoding a message as a group element, one could just view it as a bit string. The encryption algorithm would have to be modified, replacing $e = h^r m$ with $e = F(h^r) \oplus m$, where F is a function that maps a random element of G (as encoded as an integer modulo p) to a bit string of the same length as m that is computationally indistinguishable from a random bit string of the same length.

One way to implement F is as follows. First, hash the 1024-bit encoding of $h^r$ down to, e.g., 56 bits using a random but publicly known 2-universal hash function. These 56 bits are fairly close to random Then these 56 bits can be used as a DES key, and generate as many pseudo-random bits as needed using DES in counter node. The security proof would then require the assumption that DES is a good pseudo-random permutation, which is quite reasonable. A more expensive pseudo-random bit generator could be used if a weaker intractability assumption were desired.

(3) Another, more efficient variant of the basic scheme runs as follows. The public key and encryption algorithm are the same, but the key generation and decryption algorithms are slightly different. In this variation, the private key consists of (w, x, y, z) $\in Z_q^4$, and the public key is computed as $$g_2 = g_1^w,\ c = g_1^x,\ d = g_1^y,\ h = g_1^z.$$

The test made by the decryption algorithm on input ($u_1$, $u_2$, e, v) is:

$$u_2 = u_1^w \text{ and } v = u_1^{x+ya},$$

where a=H($u_1$, $u_2$, e). If this test passes, the output of the encryption algorithm is $m = e/u_1^z$.

A further embodiment is described in the following implementation.

(4) A large prime p is chosen such that p−1=2q, where q is also prime. The group G is a subgroup of order q in $Z_p^*$. The message is restricted to be an element of a set {1, ..., q}, and "encoded" by squaring it modulo p, giving an element in G. A message can be recovered from its encoding by computing the unique square root of its encoding modulo p that is in the set {1, ..., q}. For the hash function, one could use a function SHA-1, or possibly some keyed variant, and make the appropriate collision-resistance assumption. However, it is only marginally more expensive to do the following, which is based only on the hardness of discrete logarithms in G. A bit string should be bashed to an integer mod q. The bit string is written as a sequence ($a_1$, ..., $a_k$), with each $a_i \in \{0, ..., q-1\}$. To define the hash function, $h_1, ..., h_k$ is chosen in G at random. The hash of ($a_1$, ..., $a_k$) is then the least non-negative residue of $\pm h_1^{a_1} ... h_k^{a_k} \in Z_p^*$, where the sign is chosen so that this value is in {1, ..., q}. This hash function is collision resistant, provided computing discrete logarithms in G is hard.

A hybrid implementation is described as another embodiment in the following.

It would be more practical to use smaller subgroups, and it is desirable to have a more flexible and efficient way to encode messages. A symmetric-key cipher C with a key length of l bits is provided. A large prime p is chosen such that p−1=qm, where q is a 3l-bit prime. The group G is a subgroup of order q in $Z_p^*$. A message in this scheme is just an arbitrary bit string. To encrypt a message m, the basic scheme is modified, computing $e = C_K(m)$, where an encryption key K is computed by hashing $h^r$ to an l-bit string with a public 2-universal hash function. For the hash function H, something like SHA-1, possibly keyed, would be appropriate. The security of this variant is provable.

In yet another embodiment an alternative hybrid implementation is addressed in the following by using a MAC (Message Authentication Code).

To encrypt a message m, the basic scheme is modified, computing $e = (e_1, e_2)$, whereby $e_1 = C_{K_1}(m)$ and $e_2 = MAC_{K_2}(e_1)$. The hash-value is derived by $a = H(u_1, u_2)$ and an encryption key $K_1, K_2$ is computed by hashing $h^r$ to an l-bit string with a public hash function which can be expressed as $(K_1, K_2) = H(h^r)$. Then, v is derivable as described in the basic scheme.

Any disclosed embodiment may be combined with one or several of the other embodiments shown and/or described. This is also possible for one or more features of the embodiments.

What is claimed is:

1. A method for generating a cryptographic key, comprising the steps of:

choosing at least a first, second, and third exponent-number ($x_1$, $x_2$, z) as part of a private key, from a set $Z_q$ of elements modulo q, whereby q is preferably a large prime, (a.) choosing at least a first base-group-number ($g_1$) and a second base-group-number ($g_2$) from a cryptographic group (G), (b.) deriving from the chosen numbers ($g_1$, $g_2$, $x_1$, $x_2$, z) at least a first and second group-number (c, h), said first group-number (c) being derivable from the product of said first base-group-number ($g_1$) raised to the power of a first monotone function $f_1$ of said first exponent-number ($x_1$) and said second base-group-number ($g_2$) raised to the power of a second monotone function $f_2$ of said second exponent-number ($x_2$), said second group-number (h) being derivable from at least one of said base-group-numbers ($g_1$, $g_2$) raised to the power of a third monotone function $f_3$ of said third exponent-number (z), (c.) making the chosen at least two base-group-numbers ($g_1$, $g_2$) and said derived at least two group-numbers (c, h) part of a public key as public-key numbers ($g_1$, $g_2$, c, h), such that said public-key numbers ($g_1$, $g_2$, c, h) are usable as bases and at least a chosen single exponent-number (r) is usable as exponent together with a plaintext (m) for forming a ciphertext (t), comprising at least a first universal and second universal cipher-number ($u_1$, $u_2$) and an encryption cipher-number (e), applying the ElGamal scheme, said ciphertext (t) further comprising a verification cipher-number (v) with which said ciphertext (t) is verifiable, said ciphertext (t) being decryptable according to said ElGamal.

2. Method according to claim 1, wherein the verification cipher-number (v) is derived from the first group-number (c) raised to the power of a monotone function $f_r$ of the single exponent-number (r).

3. Method according to claim 1, wherein at least the first, second, and third exponent-number ($x_1$, $x_2$, z) and/or the at least two base-group numbers ($g_1$, $g_2$) are different and/or chosen randomly.

4. Method according to claim 1, wherein at least a fourth and fifth exponent-number ($y_1$, $y_2$) are chosen as a further part of the private key and a third group-number (d) is derived form the product of the first base-group-number ($g_1$) raised to the power of a fourth monotone function $f_4$ of said fourth exponent-number ($y_1$) and the second base-group-number ($g_2$) raised to the power of a fifth monotone function $f_5$ of said fifth exponent-number ($y_2$), making said third group-number (d) a further part of the public key which is usable for generating the verification cipher-number (v), whereby said verification cipher-number (v) is derivable by raising said third group-number (d) to the power of a hash-value (a) and multiplying the result with the first group-number (c), and raising this result to the power of a monotone function $f_r$ of the single exponent-number (r).

5. Method according to claim 4, wherein at least the fourth and fifth exponent-number ($y_1$, $y_2$) and/or the at least two base-group numbers ($g_1$, $g_2$) are different and/or chosen randomly.

6. Method according to claim 1, being carried out by means of technical means, such as a computer program.

7. Storage medium comprising machine-readable code of a computerized method according to claim 1.

8. Data-processing unit equipped with a storage medium according to claim 7.

9. Storage medium comprising machine-readable program code for controlling computer hardware to perform the method according to claim 1.

10. A data-processing unit equipped with a storage medium according to claim 9.

11. A method for encrypting a plaintext (m) using a provided public key and a private key, comprising at least a first base-group-number ($g_1$), a second base-group-number ($g_2$), a first group-number (c), and a second group-number (h), said method comprising the steps of:

(a.) choosing at least a single exponent-number (r) from a set $Z_q$ of elements modulo q, whereby q is preferably a large prime, (b.) forming from said plaintext (m) a ciphertext (t) comprising a first universal and second universal cipher-number ($u_1$, $u_2$), and an encryption- and a verification cipher-number (e, v), whereby said first universal cipher-number ($u_1$), said second-universal cipher-number ($u_2$), and said encryption cipher-number (e) are generated by applying the ElGamal scheme using said first base-group-number ($g_1$), said second base-group-number $g_2$), said single exponent-number (r), said second group-number (h), and said plaintext (m), and said verification cipher-number (v) is generated based on said first group-number (c) raised to the power of a monotone function $f_r$ of said single exponent-number (r) such that with it at least part of said ciphertext (t) is verifiable, by using at least a first and second exponent-number ($x_1$, $x_2$) which form part of said private key for testing whether the verification cipher-number (v) is equal to the product of said first universal cipher-number ($u_1$) raised to the power of a first monotone function $f_1$ of said first exponent-number ($x_1$) and said second-universal cipher-number ($u_2$) raised to the power of a second monotone function $f_2$ of said second exponent-number ($x_2$), so that the testing requires access to said private key and determines whether said ciphertext was encrypted using said private key; and said ciphertext (t) being decryptable according to the ElGamal scheme.

12. Method according to one of claim 11 wherein a hash-value (a) is generated by applying a hash-function (H) on at least one of the first universal, second universal, and encryption cipher-number ($u_1$, $u_2$, e).

13. Method according to claim 12, wherein the public key provides furthermore a third group-number (d) that is usable for generating the verification cipher-number (v) by raising said third group-number (d) to the power of the hash-value (a) by using at least a first and second exponent-number ($x_1$, $x_2$) which form part of a private key for testing whether the verification cipher-number (v) is equal to the product of said first universal cipher-number ($u_1$) raised to the power of a first monotone function $f_1$ of said first exponent-number ($x_1$) and said second-universal cipher-number ($u_2$) raised to the power of a second monotone function $f_2$ of said second exponent-number ($x_2$)) and multiplying the result with the first group-number (c) and raising this result to the power of the monotone function $f_r$ of the single exponent-number (r).

14. A method according to claim 11, being carried out by means of technical means, such as a computer program.

15. A data-processing unit equipped with a storage medium according to claim 14.

16. A storage medium comprising machine-readable code of a computerized method according to claim 11.

17. A data-processing unit equipped with a storage medium according to claim 16.

18. A storage medium comprising machine-readable program code for controlling computer hardware to perform the method according to claim 11.

19. A data-processing unit equipped with a storage medium according to claim 18.

20. A method for verifying a ciphertext (t) comprising at least a verification cipher-number (v), and a first universal and a second universal cipher-number ($u_1$, $u_2$), using at least a first and second exponent-number ($x_1$, $x_2$) which form part of a private key, said method comprising the step of:

testing whether said verification cipher-number (v) is equal to the product of the first universal cipher-number ($u_1$) raised to the power of a first monotone function $f_1$ of the first exponent-number ($x_1$) and the second universal cipher-number ($u_2$) raised to the power of a second monotone function $f_2$ of the second exponent-number ($x_2$), whereby the testing requires access to said private key and determines whether said ciphertext was encrypted using said private key, and said ciphertext (t) is decryptable according to the ElGamal scheme.

21. Method according to claim 20, wherein a hash-value (a) is derived by applying a hash function H on at least part of the ciphertext (t), and said hash-value (a) is used together with a first monotone function $f_1$ of the first exponent-number ($x_1$), a second monotone function $f_2$ of the second exponent-number ($x_2$), a fourth monotone function $f_4$ of a fourth exponent-number ($y_1$), and a fifth monotone function $f_5$ of a fifth exponent-number ($y_2$), said fourth exponent-number ($y_1$) and said fifth exponent-number ($y_2$) form further part of the private key, for testing if $$u_1^{f_1(x_1)+f_4(y_1)a}u_2^{f_2(x_2)+f_5(y_2)a}=v.$$

22. A method for decrypting a ciphertext (t), comprising a first universal and second universal cipher-number ($u_1$, $u_2$) and an encryption- and a verification cipher-number (e, v), into a plaintext (m) using a third exponent-number (z) which forms part of a private key, said method comprising the step of:
   recovering said plaintext (m) according to the ElGamal scheme,
   said ciphertext (t) having been derived from at least two base-group-numbers ($g_1$, $g_2$), two group-numbers (c, h) which form part of a public key, and a first and second exponent-number ($x_1$, $x_2$) which form part of a private key, and said ciphertext (t) being verifiable before the decryption by testing whether said verification cipher-number (v) has been encrypted according to the method of claim 6, which testing requires access to said private key and determines whether said ciphertext was encrypted using said private key.

23. A method for encrypting a plaintext (m) using a provided public key and a private key, comprising at least a first base-group-number ($g_1$), a second base-group-number ($g_2$), a first group-number (c), and a second group-number (h), said method comprising the steps of:
   choosing at least a single exponent-number (r) from a set from a set $Z_q$ of elements modulo q, whereby q is preferably a large prime,
   forming from said plaintext (m) a ciphertext (t) comprising a first universal and second universal cipher-number ($u_1$, $u_2$), and an encryption- and a verification cipher-number (e, v), whereby
      said first universal cipher-number ($u_1$), said second-universal cipher-number ($u_2$), and said encryption cipher-number (e) are generated by applying the ElGamal scheme using said first base-group-number ($g_1$), said second base-group-number ($g_2$), said single exponent-number (r), said second group-number (h), and said plaintext (m), and
      said verification cipher-number (v) is generated such that with it at least part of said ciphertext (t) is verifiable, said ciphertext (t) being decryptable according to the ElGamal scheme;
   decrypting the ciphertext into a plaintext (m) using a third exponent-number (z) which forms part of a private key, and
   recovering said plaintext (m) according to the ElGamal scheme,
      said ciphertext (t) having been derived from at least two base-group-numbers ($g_1$, $g_2$), two group-numbers (c, h) which form part of a public key, and a first and second exponent-number ($x_1$, $x_2$) which form part of a private key, wherein the ciphertext (t) has been derived from a third group-number (d) which forms part of the public key and a fourth and a fifth exponent-number ($y_1$, $y_2$) which form part of the private key.

24. A method according to claim 23, being carried out by means of technical means, such as a computer program.

25. A data-processing unit equipped with a storage medium according to claim 24.

26. A storage medium comprising machine-readable code of a computerized method according to claim 23.

27. A data-processing unit equipped with a storage medium according to claim 26.

28. A storage medium comprising machine-readable program code for controlling computer hardware to perform the method according to claim 23.

29. A data-processing unit equipped with a storage medium according to claim 28.

30. An article of manufacture comprising a computer usable medium having computer readable program code means embodied therein for causing generation of a cryptographic key, the computer readable program code means in said article of manufacture comprising computer readable program code means for causing a computer to effect:
   (a.) choosing at least a first, second, and third exponent-number ($x_1$, $x_2$, z) as part of a private key, from a set $Z_q$ of elements modulo q, whereby q is preferably a large prime,
   (b.) choosing at least a first base-group-number ($g_1$) and a second base-group-number ($g_2$) from a cryptographic group (G),
   (c.) deriving from the chosen numbers ($g_1$, $g_2$, $x_1$, $x_2$, z) at least a first and second group-number (c, h),
      said first group-number (c) being derivable from the product of said first base-group-number ($g_1$) raised to the power of a first monotone function $f_1$ of said first exponent-number ($x_1$) and said second base-group-number ($g_2$) raised to the power of a second monotone function $f_2$ of said second exponent-number ($x_2$),
      said second group-number (h) being derivable from at least one of said base-group-numbers ($g_1$, $g_2$) raised to the power of a third monotone function $f_3$ of said third exponent-number (z),
   (d.) making the chosen at least two base-group-numbers ($g_1$, $g_2$) and said derived at least two group-numbers (c, h) part of a public key as public-key numbers ($g_1$, $g_2$, c, h),
      such that said public-key numbers ($g_1$, $g_2$, c, h) are usable as bases and at least a chosen single exponent-number (r) is usable as exponent together with a plaintext (m) for forming a ciphertext (t), comprising at least a first universal and second universal cipher-number ($u_1$, $u_2$) and an encryption cipher-number (e),
      applying the ElGamal scheme, said ciphertext (t) further comprising a verification cipher-number (v) with which said ciphertext (t) is verifiable,
      said ciphertext (t) being decryptable according to said ElGamal.

31. A computer program product comprising a computer usable medium having computer readable program code means embodied therein for causing encryption of a plaintext (m) using a provided public key comprising at least a first base-group-number ($g_1$), a second base-group-number ($g_2$), a first group-number (c), and a second group-number (h), the computer readable program code means in said computer program product comprising computer readable program code means for causing a computer to effect:
   (a.) choosing at least a single exponent-number (r) from a set from a set $Z_q$ of elements modulo q, whereby q is preferably a large prime,
   (b.) forming from said plaintext (m) a ciphertext (t) comprising a first universal and second universal cipher-number ($u_1$, $u_2$), and an encryption- and a verification cipher-number (e, v), whereby said first universal cipher-number ($u_1$), said second-universal cipher-number ($u_2$), and said encryption cipher-number (e) are generated by applying the ElGamal scheme using said first base-group-number ($g_1$), said second base-group-number ($g_2$), said single exponent-number (r), said second group-number (h), and said plaintext (m), and said verification cipher-number (v) is generated based on said first group-number (c) raised to the power of a monotone function $f_r$ of said single exponent-number (r) such that with it at least part of said ciphertext (t) is verifiable, by using at least a first and second exponent-number ($x_1$, $x_2$) which form part of said private key for testing whether the verification cipher-number (v) is equal to the product of said first universal cipher-number ($u_1$) raised to the power of a first monotone function $f_1$ of said first exponent-number ($x_1$) and said second-universal cipher-number ($u_2$) raised to the power of a second monotone function $f_2$ of said second exponent-number ($x_2$), so that the testing requires access to said private key and determines whether said ciphertext was encrypted using said private key; and said ciphertext (t) being decryptable according to the ElGamal scheme.

* * * * *